United States Patent
Hartman et al.

(10) Patent No.: US 6,266,596 B1
(45) Date of Patent: Jul. 24, 2001

(54) METHOD AND APPARATUS FOR CONTROLLING A MOBILE MACHINE DURING START-UP

(75) Inventors: Darren A. Hartman; Kevin X. Huang, both of Peoria, IL (US); James A. Krellner, Crolles (FR); John J. Krone, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/592,622

(22) Filed: Jun. 13, 2000

(51) Int. Cl.$^7$ .................................................. B62D 5/04
(52) U.S. Cl. .............................. 701/50; 701/41; 701/113; 180/419
(58) Field of Search .............................. 701/50, 41, 113, 701/54, 97; 180/418, 419, 421, 422, 446

(56) References Cited

U.S. PATENT DOCUMENTS

| | | | |
|---|---|---|---|
| 3,795,285 | 3/1974 | Scholl et al. ........................ | 180/271 |
| 4,771,851 | 9/1988 | Nystuen et al. ..................... | 180/419 |
| 4,802,545 | 2/1989 | Nystuen et al. ..................... | 180/419 |
| 5,303,636 | * 4/1994 | Stephenson et al. ................ | 91/471 |
| 5,790,966 | * 8/1998 | Madau et al. ....................... | 701/41 |

* cited by examiner

Primary Examiner—Tan Nguyen
(74) Attorney, Agent, or Firm—Steve D. Lundquist

(57) ABSTRACT

A method and apparatus for controlling a mobile machine during start-up. The mobile machine has a prime power source, a means for transport, and at least one auxiliary system; the means for transport and the at least one auxiliary system are controllably driven by the prime power source. The method and apparatus includes determining an actual angle of steering of the mobile machine, comparing the actual angle of steering with a desired angle of steering, starting the prime power source, enabling engagement of the at least one auxiliary system, and disabling engagement of the means for transport in response to the difference between the actual angle of steering and the desired angle of steering being greater than a predetermined threshold value.

23 Claims, 5 Drawing Sheets

Fig_1_

Fig-3-

METHOD AND APPARATUS FOR CONTROLLING A MOBILE MACHINE DURING START-UP

TECHNICAL FIELD

This invention relates generally to a method and apparatus for controlling a mobile machine during a start-up operation and, more particularly, to a method and apparatus for controllably preventing undesired movement of the mobile machine during start-up.

BACKGROUND ART

Mobile machine, for example, earthworking machines, construction machines, transport machines, and the like, are used for a wide variety of purposes. During these uses, it is common to periodically shut down the prime power source, e.g., an engine, either deliberately or inadvertently. For example, it may be necessary to power down the engine if the operator must leave the mobile machine frequently. As another example, the load demands on a mobile machine, such as an earthworking or construction machine, may result in periodic stalling of the engine.

In the above cases, it logically becomes necessary to engage a start-up process to start the engine after each shut down. These start-up sequences, however, may result in a problem if, for some reason, operator control of the steering of the mobile machine is not in synchronization with the actual steering angle of the mobile machine. This lack of synchronization may cause the mobile machine to suddenly move, i.e., "lurch", in an undesired direction during the start-up process. For example, the steering wheel of the mobile machine may appear to the operator to be set for straight ahead travel, but the actual steering angle of the mobile machine may be set for either a right or left direction, thus causing the mobile machine to suddenly move either to the right or the left to the surprise of the operator.

Attempts in the past have been made to resolve this problem. For example, in U.S. Pat. No. 3,795,285, Scholl et al. (Scholl) discloses a steering system for an articulated mobile machine which determines if the actual angle of steering differs from the desired angle of steering beyond a threshold value during the start-up process. The system prevents the engine from starting in response to the threshold being exceeded.

However, many auxiliary systems on a mobile machine, for example, hydraulic systems on a work machine, receive power from the engine. Therefore, if the engine is not allowed to start, these auxiliary systems will not function. In some circumstances, it may be desired to provide power to the auxiliary systems even though the mobile machine is not aligned for steering. Thus, it may be desired to allow the engine to start, yet still prevent the mobile machine from moving until the steering is aligned. For example, a wheel loader engine may stall while a fully loaded bucket is in a raised position. It would be desirable to have control of the hydraulic system to finish dumping and lowering the bucket even though the wheel loader is not allowed to move so that any potential problems from an offset center of gravity of the wheel loader are avoided when movement is allowed.

The present invention is directed to overcoming one or more of the problems as set forth above.

DISCLOSURE OF THE INVENTION

In one aspect of the present invention a method for controlling a mobile machine during start-up is disclosed. The mobile machine has a prime power source, a means for transport, and at least one auxiliary system; the means for transport and the at least one auxiliary system are controllably driven by the prime power source. The method includes the steps of determining an actual angle of steering of the mobile machine, comparing the actual angle of steering with a desired angle of steering, starting the prime power source, enabling engagement of the at least one auxiliary system, and disabling engagement of the means for transport in response to the difference between the actual angle of steering and the desired angle of steering being greater than a predetermined threshold value.

In another aspect of the present invention a method for controlling a mobile machine during start-up is disclosed. The mobile machine has an engine, a drive train, and at least one auxiliary system; the drive train and the at least one auxiliary system are controllably driven by the engine. The method includes the steps of determining an actual angle of steering of the mobile machine, comparing the actual angle of steering with a desired angle of steering, starting the engine, enabling engagement of the at least one auxiliary system, and disabling engagement of the drive train in response to the difference between the actual angle of steering and the desired angle of steering being greater than a predetermined threshold value.

In another aspect of the present invention a method for controlling an articulated mobile machine during start-up is disclosed. The articulated mobile machine has a prime power source, a means for transport, an articulating actuator system, and at least one auxiliary system; the means for transport, the articulating actuator system, and the at least one auxiliary system are controllably driven by the prime power source. The method includes the steps of determining a steering control angle of a steering control mechanism located on the articulated mobile machine, determining an articulation angle of the articulated mobile machine as a function of the articulating actuator system, comparing the steering control angle with the articulation angle, starting the prime power source, enabling engagement of the at least one auxiliary system, disabling engagement of the articulating actuator system in response to the steering control angle being greater than a predetermined difference in value from the articulation angle, and enabling engagement of the articulating actuator system in response to the steering control angle being less than a predetermined difference in value from the articulation angle.

In yet another aspect of the present invention an apparatus for controlling a mobile machine during start-up is disclosed. The mobile machine has a prime power source, a means for transport, and at least one auxiliary system; the means for transport and the at least one auxiliary system are controllably driven by the prime power source. The apparatus includes a steering angle sensor, and a controller adapted to determine an actual angle of steering of the mobile machine, compare the actual angle of steering with a desired angle of steering, start the prime power source, enable engagement of the at least one auxiliary system, and disable engagement of the means for transport in response to the difference between the actual angle of steering and the desired angle of steering being greater than a predetermined threshold value.

In yet another aspect of the present invention an apparatus for controlling an articulated mobile machine during start-up is disclosed. The articulated mobile machine has a prime power source, a means for transport, an articulating actuator system, and at least one auxiliary system; the means for transport, the articulating actuator system, and the at least one auxiliary system are controllably driven by the prime power source. The apparatus includes a steering control mechanism, a steering control angle sensor for sensing a steering control angle of the steering control mechanism, an articulation angle sensor for sensing an articulation angle of the articulated mobile machine as a function of the articulating actuator system, and a controller adapted to compare the steering control angle with the articulation angle, start the prime power source, enable engagement of the at least one auxiliary system, disable engagement of the articulating actuator system in response to the steering control angle being greater than a predetermined difference in value from the articulation angle, and enable engagement of the articulating actuator system in response to the steering control angle being less than a predetermined difference in value from the articulation angle.

In yet another aspect of the present invention an apparatus for controlling a mobile machine during start-up is disclosed. The mobile machine has a prime power source, a means for transport, and at least one auxiliary system; the means for transport and the at least one auxiliary system are controllably driven by the prime power source. The apparatus includes means for determining an actual angle of steering of the mobile machine, means for comparing the actual angle of steering with a desired angle of steering, means for starting the prime power source, means for enabling engagement of the at least one auxiliary system, means for disabling engagement of the means for transport in response to the difference between the actual angle of steering and the desired angle of steering being greater than a predetermined threshold value, and means for enabling engagement of the means for transport in response to the difference between the actual angle of steering and the desired angle of steering being less than a predetermined threshold value.

BEST MODE FOR CARRYING OUT THE INVENTION

Figure 1:
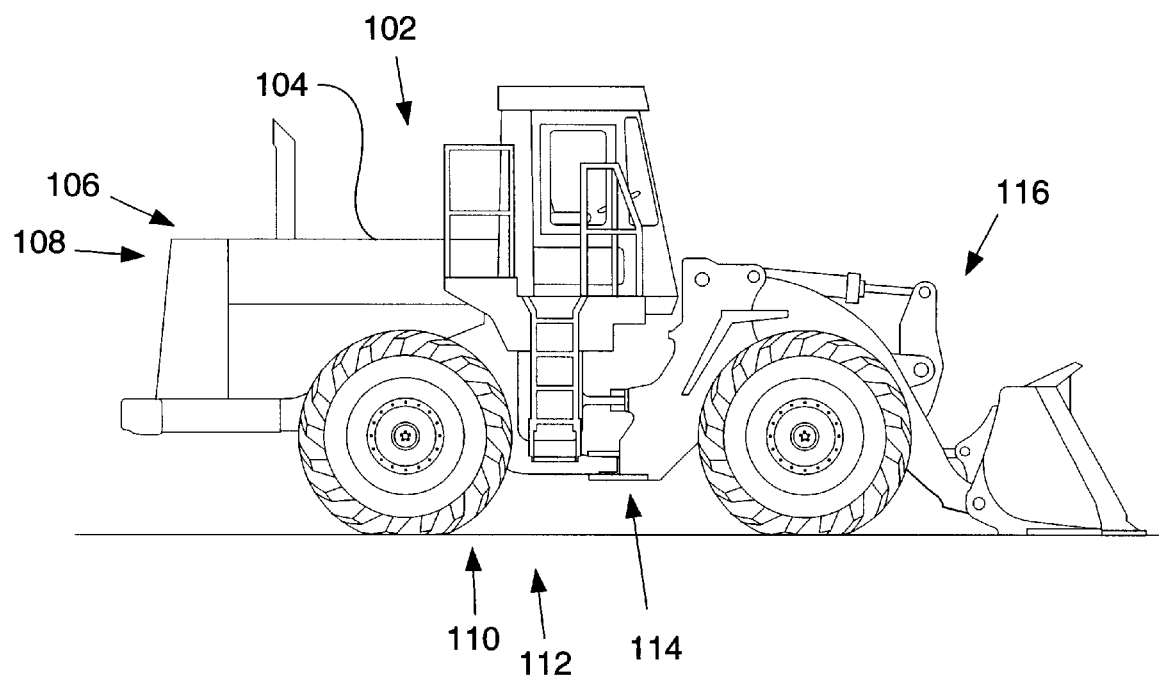
FIG. 1 is a diagrammatic illustration of a mobile machine suitable for use with the present invention.

Referring to the drawings, and with particular reference to FIG. 1, a diagrammatic illustration of a mobile machine 102 suitable for use with the method and apparatus 100 of the present invention is shown. The mobile machine 102 depicted in FIG. 1 is an articulated mobile machine 104. In particular, the articulated mobile machine 104 of FIG. 1 is an articulated wheel loader, used in a variety of earthworking and construction applications. However, the mobile machine 102 may be some other type of mobile machine, such as dozers, graders, trucks, material handling machines such as fork lifts, compactors, and the like. In addition, the mobile machine 102 may or may not be articulated.

The present invention, as described below in a first embodiment, may apply to many types of mobile machines with various methods for steering. However, the present invention is particularly well suited for use with articulated mobile machines, and is also described below in an alternate embodiment specifically for articulated mobile machines.

In the preferred embodiment, the mobile machine 102 includes a prime power source 106. The prime power source 102 is preferably an engine 108, such as an internal combustion engine. However, the prime power source 106 may be an alternate device, such as an electric motor. For purposes of describing the present invention, the prime power source 106 is referred to as an engine 108 in the following discussion.

The engine 108 provides power to a means 110 for transport to provide mobility to the mobile machine 102. The means 110 for transport is generally referred to as a drive train 112, and is hereinafter referred to as such. Preferably, the drive train 112 includes a transmission, one or more drive shafts, and a set of ground engaging members, such as wheels or tracks. The structure and function of drive trains for mobile machines is well known in the art and is not discussed further.

In the alternate embodiment of the present invention in which an articulated mobile machine 104 is used, the articulated mobile machine 104 includes an articulating actuator system 114. The articulating actuator system 114 used in the present invention is an active system, preferably including hydraulic or electro-hydraulic cylinders to perform steering of the mobile machine 102 at the articulated location. For example, hydraulic cylinders (not shown) may be used to cause the articulated location to rotate with respect to the heading of the articulated mobile machine 104, thus resulting in steering of the machine 104 in a controlled manner. The use of articulated actuator systems to provide steering of articulated mobile machines is well known in the art and is not discussed further.

It is noted, however, that some mobile machines may be considered to be articulated mobile machines, but use methods for steering other than articulating actuator systems. For example, semi-tractor/trailer trucks, extended length buses, and mobile machines pulling implements in tow packages may be considered to be articulated. Since steering is performed by other means, such as front wheel steering, differential steering, and the like, however, these mobile machines may be adapted to utilize the first embodiment of the present invention, and not the alternate embodiment, which applies specifically to mobile machines steered by articulation.

In the preferred embodiment, the mobile machine 102 used in the present invention includes at least one auxiliary system 116. For example, the wheel loader shown in FIG. 1 includes a hydraulically actuated bucket to perform certain work operations, such as digging, carrying, and dumping. Preferably, the auxiliary system 116 is powered by the engine 108. Therefore, the engine 108 must be running for the auxiliary system 116 to function. As another example of an auxiliary system 116, a material handling machine, such as a fork lift truck, performs lifting and carrying operations by means of a hydraulic system to raise and lower the forks. This hydraulic system is also powered by the engine which powers the drive train.

Figure 2:
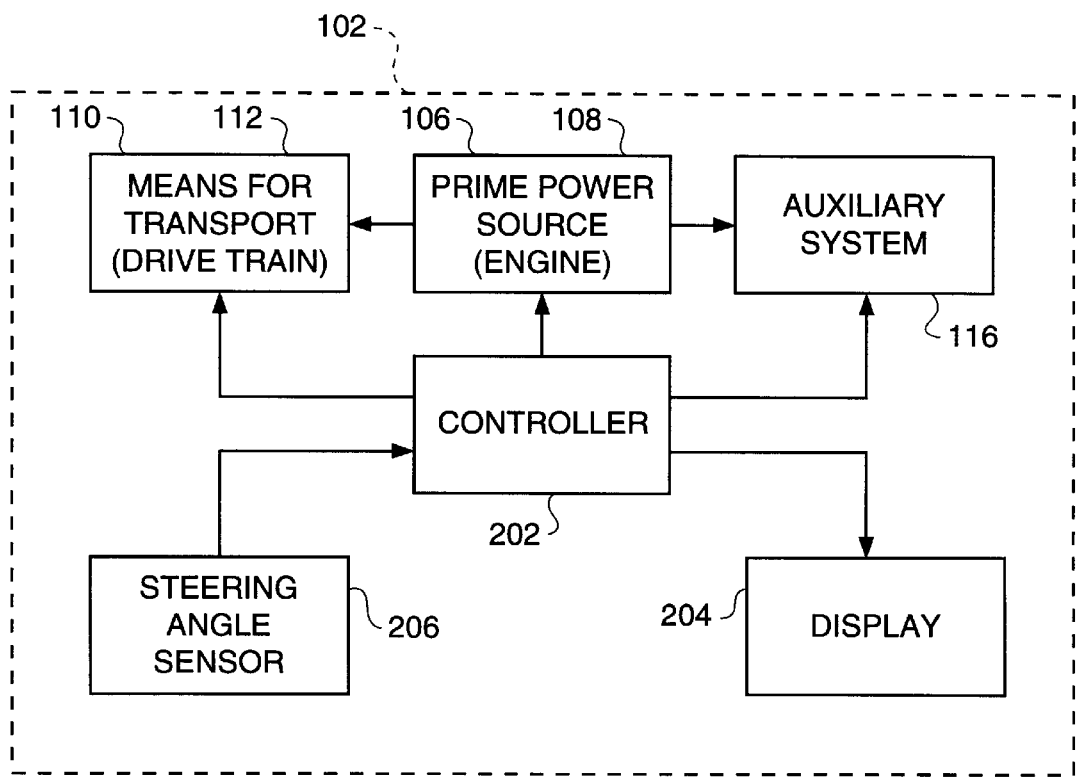
FIG. 2 is a block diagram illustrating a preferred aspect of a first embodiment of the present invention.

Referring to FIG. 2, a block diagram illustrating a preferred aspect of a first embodiment of the present invention is shown.

A controller 202, located on the mobile machine 102, is adapted to determine an actual angle of steering of the mobile machine 102, compare the actual angle of steering with a desired angle of steering, start the engine 108, enable engagement of one or more auxiliary systems 116, and disable engagement of the drive train 112 in response to the difference between the actual angle of steering and the desired angle of steering being greater than a predetermined threshold value. In addition, the controller 202 is adapted to enable engagement of the drive train 112 in response to the difference between the actual angle of steering and the desired angle of steering being less than the predetermined threshold value.

In the preferred embodiment, the controller 202 is a computer-based controller, i.e., microprocessor-based. However, the controller 202 may be of some other type, e.g., discrete logic circuits, and such, without deviating from the spirit of the invention.

The predetermined threshold value of the difference between the actual angle of steering and the desired angle of steering is typically determined as a range in degrees, such as plus and minus 2 degrees, for example.

Preferably, the actual angle of steering is determined by a steering angle sensor 206. The steering angle sensor 206 may be any of a variety of types. For example, the amount of rotation of a steering wheel or steering column may be sensed by a resolver, the angle of turn of steerable wheels may be sensed, the amount of displacement of steering control linkages may be sensed, and the like.

A display 204, located on the mobile machine 102, is preferably used to provide an operator with an indication of the difference between the actual angle of steering and the desired angle of steering. For example, the display 204 may be a gauge or light bar indicator which indicates the actual angle of steering as compared with the desired angle of steering. Alternatively, the display 204 may indicate when the difference between the actual angle of steering and the desired angle of steering is less than the predetermined threshold value, such as, for example, lighting up only when the above condition is met, or being lit until the above condition is met.

Figure 3:
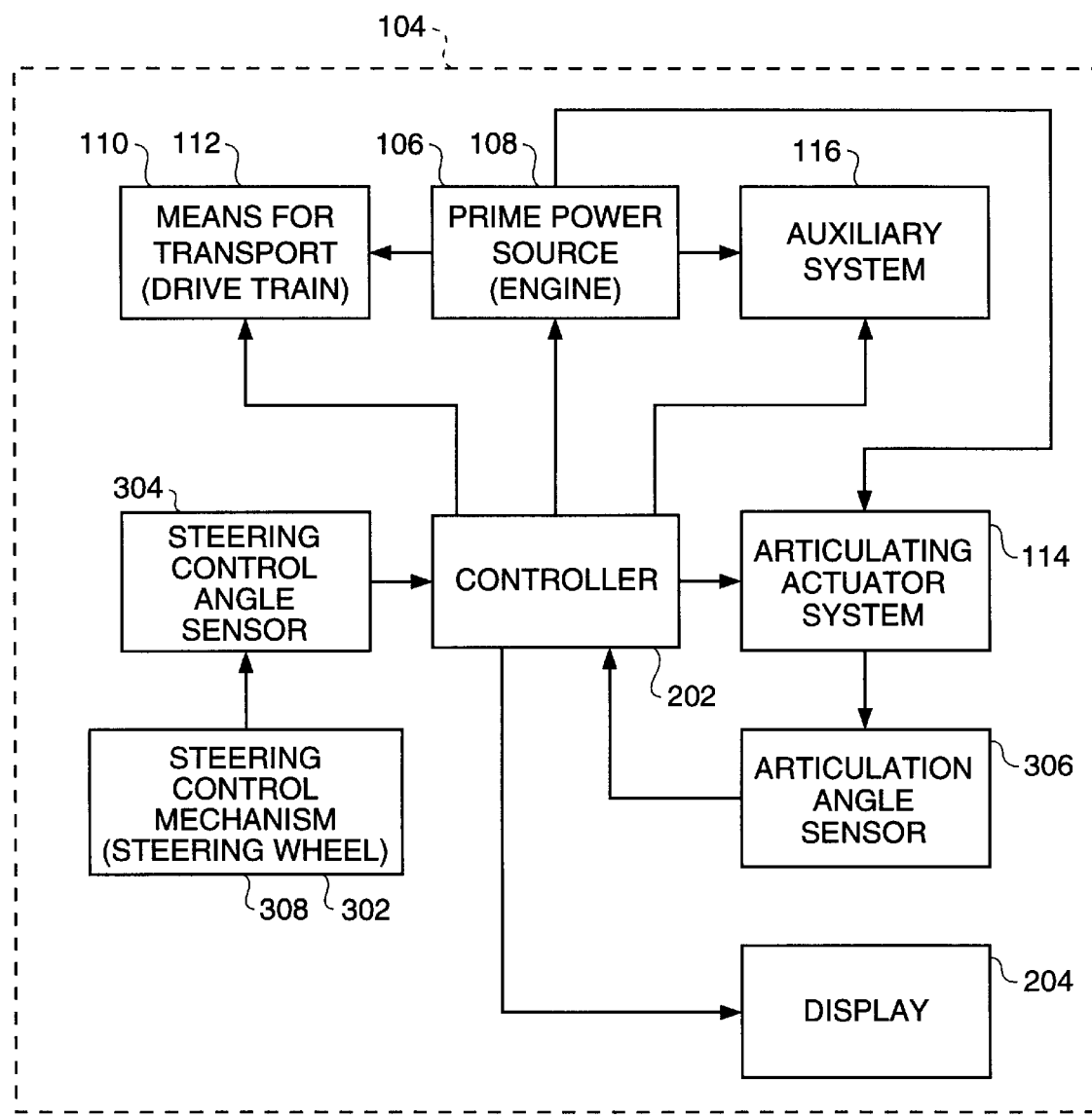
FIG. 3 is a block diagram illustrating a preferred aspect of a second embodiment of the present invention.

Referring to FIG. 3, a block diagram illustrating a preferred aspect of an alternate embodiment of the present invention is shown. It is noted that the controller 202 and the display 204 perform the functions as described above.

The alternate embodiment depicted in FIG. 3 is suited for use with an articulated mobile machine 104, and is a particular application of the present invention as embodied in the first embodiment described above.

In the preferred embodiment, a steering control mechanism 302, located on the articulated mobile machine 104, is used by an operator to control steering of the articulated mobile machine 104. Preferably, the steering control mechanism 302 is a steering wheel 308. However, the steering control mechanism 302 may be some other type of steering control means, such as joysticks, foot pedals, and the like, without deviating from the spirit of the invention.

Preferably, the position of the steering control mechanism 302 is sensed by a steering control angle sensor 304, such as a resolver. The steering control angle sensor 304 is adapted to provide a value of the steering control angle to the controller 202.

An articulation angle sensor 306, located on the articulated mobile machine 104, is adapted to sense the articulation angle of the articulated mobile machine 104 as a function of the articulating actuator system 114. For example, the articulation angle sensor 306 may determine the articulation angle by sensing the amount of extension of the hydraulic cylinders of the articulating actuator system 114. Alternatively, the articulation angle sensor 306 may be adapted to sense the articulation angle of the articulated mobile machine 104 directly, e.g., by the use of resolvers.

The articulation angle sensor 306 is adapted to provide a value of the articulation angle of the articulated mobile machine 104 to the controller 202.

The controller 202, then, is adapted to compare the steering control angle with the articulation angle, start the engine, enable engagement of one or more auxiliary systems 116, disable engagement of the articulating actuator system 114 in response to the steering control angle being greater than a predetermined difference in value from the articulation angle, and enable engagement of the articulating actuator system 114 in response to the steering control angle being less than a predetermined difference in value from the articulation angle.

In the preferred embodiment, the controller 202 is further adapted to disable engagement of the drive train 112 in response to the steering control angle being greater than a predetermined difference in value from the articulation angle, and to enable engagement of the drive train 112 in response to the steering control angle being less than a predetermined difference in value from the articulation angle.

Preferably, the predetermined difference in value between the steering control angle and the articulation angle is based on a range in degrees in steering, such as plus and minus two degrees.

The display 204 is preferably adapted to display the difference between the steering control angle and the articulation angle by any of the means described above.

Figure 4:
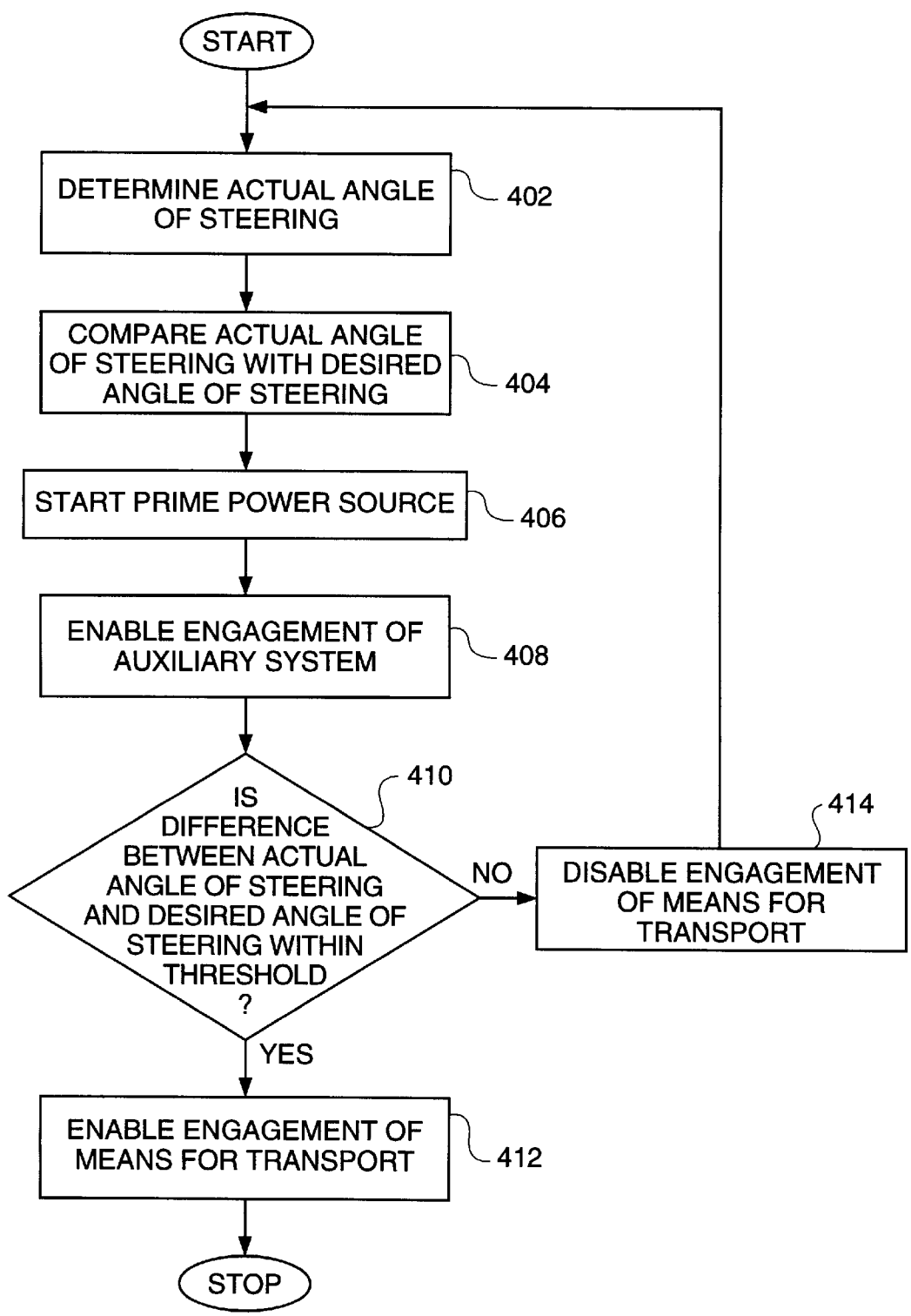
FIG. 4 is a flow diagram illustrating a preferred method of one aspect of the present invention.

Referring to FIG. 4, a flow diagram illustrating a preferred method of the first embodiment of the present invention is shown.

In a first control block 402, the actual angle of steering is determined, preferably by use of the steering angle sensor 206.

In a second control block 404, the actual angle of steering is compared with the desired angle of steering. Preferably, the desired angle of steering is determined as a function of the type of mobile machine 102, and the conditions under which the mobile machine 102 is intended to operate. The desired angle of steering is then preferably stored in memory in the controller 202.

In a third control block 406, the engine 108 is started. Control then proceeds to a fourth control block 408, in which one or more auxiliary systems 116 are enabled to be engaged. Preferably, the auxiliary systems 116 require the engine 108 to be running to operate.

In a first decision block 410, it is determined if the difference between the actual angle of steering and the desired angle of steering is within a predetermined threshold value. If the difference is within the threshold, control proceeds to a fifth control block 412, in which engagement of the drive train 112 is enabled, thus allowing the mobile machine 102 to travel.

If, in the first decision block 410, it is determined that the difference is not within the threshold, control proceeds to a sixth control block 414, in which engagement of the drive train 112 is disabled, thus preventing the mobile machine 102 from traveling. Control then returns to the first control block 402, and loops until the difference between the actual angle of steering and the desired angle of steering is brought within the threshold.

Figure 5:
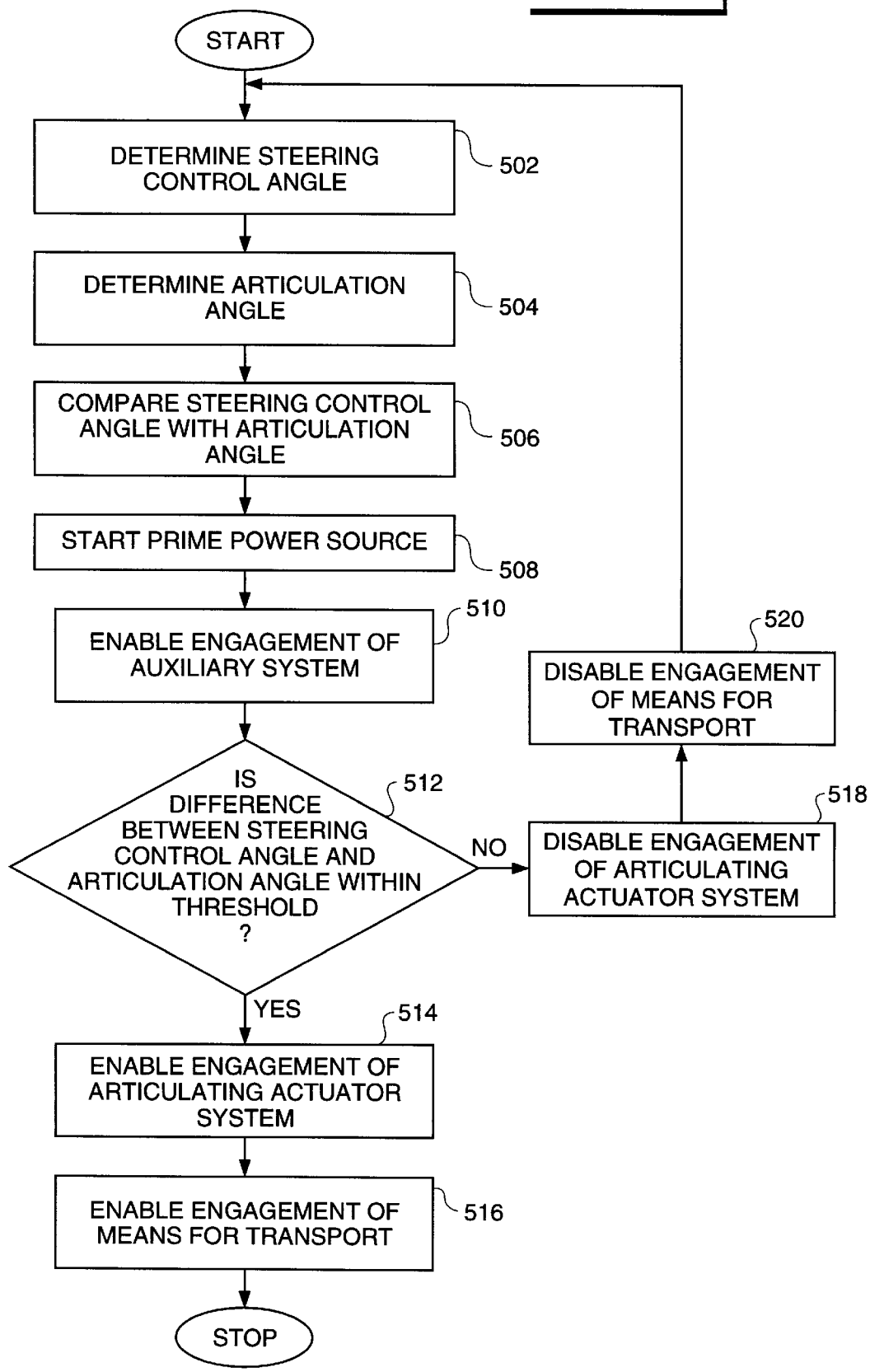
FIG. 5 is a flow diagram illustrating a preferred method of another aspect of the present invention.

Referring to FIG. 5, a flow diagram illustrating a preferred method of the second embodiment of the present invention is shown. As noted above, the second embodiment is particularly well suited for use with an articulated mobile machine 104.

In a first control block 502, the steering control angle of the steering control mechanism 302 is determined, preferably by the steering control angle sensor 304.

In a second control block 504, the articulation angle of the articulated mobile machine 104 is determined, preferably by the articulation angle sensor 306.

In a third control block 506, the controller 202 compares the steering control angle with the articulation angle to determine the difference, preferably in degrees, between the two.

In a fourth control block 508, the engine 108 is started.

In a fifth control block 510, one or more auxiliary systems 116 is enabled to be engaged.

In a first decision block 512, it is determined if the difference between the steering control angle and the articulation angle is within a threshold level.

If the difference is within the threshold, control proceeds to a sixth control block 514, in which engagement of the articulating actuator system 114 is enabled, thus allowing steering control of the articulated mobile machine 104. In a seventh control block 516, engagement of the drive train 112 is enabled, thus allowing the articulated mobile machine 104 to travel.

If the difference is not within the threshold, control proceeds to an eighth control block 518, in which engagement of the articulating actuator system 114 to be disabled, thus preventing steering control of the articulated mobile machine 104. In a ninth control block 520, engagement of the drive train 112 is disabled, thus preventing the articulating mobile machine 104 from travel. Control then returns to the first control block 502, and loops until the difference is brought within the threshold by adjusting the steering control mechanism 302.

INDUSTRIAL APPLICABILITY

As an example of an application of the present invention, the articulated mobile machine 104 of FIG. 1, i.e., articulated wheel loader, may be used to perform work such as loading material into trucks. During the work process, the engine 108 may stall due to, for example, the heavy work load of the loading process. For example, the loader may have lifted the bucket to begin the dumping process into a truck bed, and the engine 108 may stall. The first response of the operator would be to restart the engine 108 to continue the work process. However, the actual steering control angle may no longer be in synchronization with the articulation angle of the articulated mobile machine 104, thus creating a situation in which the machine 104 may, upon restart, suddenly move in a direction unknown to, and undesired by, the operator.

Efforts have previously been developed to prevent an engine from starting in this situation, as disclosed in U.S. Pat. No. 3,795,285 to Scholl et al. However, it may be desirable, such as in the exemplary situation described herein, to be capable of allowing the engine 108 to start so that an auxiliary system 116, such as the hydraulic system for the bucket, may be enabled. Thus, the operator may be allowed to complete the loading cycle, even though the machine 104 is not allowed to move unexpectedly. This allows the operator to empty the bucket of the loaded material and lower the bucket in a controlled manner. The operator may then align the steering wheel with the articulation angle of the machine 104, thus allowing engagement of steering control of the articulated actuator system 114 and engagement of the drive train 112.

Other aspects, objects, and features of the present invention can be obtained from a study of the drawings, the disclosure, and the appended claims.

What is claimed is:

1. A computer-based method for controlling a mobile machine during start-up, the mobile machine having a prime power source, a means for transport, and at least one auxiliary system; the means for transport and the at least one auxiliary system being controllably driven by the prime power source, including the steps of:

determining an actual angle of steering of the mobile machine;

comparing the actual angle of steering with a desired angle of steering;

starting the prime power source;

enabling engagement of the at least one auxiliary system; and disabling engagement of the means for transport in response to the difference between the actual angle of steering and the desired angle of steering being greater than a predetermined threshold value.

2. A method, as set forth in claim 1, further including the step of enabling engagement of the means for transport in response to the difference between the actual angle of steering and the desired angle of steering being less than a predetermined threshold value.

3. A method, as set forth in claim 2, further including the step of displaying the difference between the actual angle of steering and the desired angle of steering to an operator of the mobile machine.

4. A computer-based method for controlling a mobile machine during start-up, the mobile machine having an engine, a drive train, and at least one auxiliary system; the drive train and the at least one auxiliary system being controllably driven by the engine, including the steps of:

determining an actual angle of steering of the mobile machine;

comparing the actual angle of steering with a desired angle of steering;

starting the engine;

enabling engagement of the at least one auxiliary system; and disabling engagement of the drive train in response to the difference between the actual angle of steering and the desired angle of steering being greater than a predetermined threshold value.

5. A method, as set forth in claim 4, further including the step of enabling engagement of the drive train in response to the difference between the actual angle of steering and the desired angle of steering being less than a predetermined threshold value.

6. A method, as set forth in claim 5, further including the step of displaying the actual angle of steering with respect to the desired angle of steering to an operator of the mobile machine.

7. A computer-based method for controlling an articulated mobile machine during start-up, the articulated mobile machine having a prime power source, a means for transport, an articulating actuator system, and at least one auxiliary system; the means for transport, the articulating actuator system, and the at least one auxiliary system being controllably driven by the prime power source, including the steps of:

determining a steering control angle of a steering control mechanism located on the articulated mobile machine;

determining an articulation angle of the articulated mobile machine as a function of the articulating actuator system;

comparing the steering control angle with the articulation angle;

starting the prime power source;

enabling engagement of the at least one auxiliary system;

disabling engagement of the articulating actuator system in response to the steering control angle being greater than a predetermined difference in value from the articulation angle; and enabling engagement of the articulating actuator system in response to the steering control angle being less than a predetermined difference in value from the articulation angle.

8. A method, as set forth in claim 7, further including the steps of:

disabling engagement of the means for transport in response to the steering control angle being greater than a predetermined difference in value from the articulation angle; and enabling engagement of the means for transport in response to the steering control angle being less than a predetermined difference in value from the articulation angle.

9. A method, as set forth in claim 8, further including the step of displaying the difference between the steering control angle and the articulation angle.

10. An apparatus for controlling a mobile machine during start-up, the mobile machine having a prime power source, a means for transport, and at least one auxiliary system; the means for transport and the at least one auxiliary system being controllably driven by the prime power source, comprising:

a steering angle sensor located on the mobile machine; and a controller adapted to determine an actual angle of steering of the mobile machine, compare the actual angle of steering with a desired angle of steering, start the prime power source, enable engagement of the at least one auxiliary system, and disable engagement of the means for transport in response to the difference between the actual angle of steering and the desired angle of steering being greater than a predetermined threshold value.

11. An apparatus, as set forth in claim 10, wherein the controller is further adapted to enable engagement of the means for transport in response to the difference between the actual angle of steering and the desired angle of steering being less than a predetermined threshold.

12. An apparatus, as set forth in claim 11, further including a display located on the mobile machine and adapted to display the difference between the actual angle of steering and the desired angle of steering.

13. An apparatus, as set forth in claim 11, wherein the means for transport is a drive train.

14. An apparatus, as set forth in claim 11, wherein the controller is located on the mobile machine, and the controller is computer-based.

15. An apparatus, as set forth in claim 10, wherein the prime power source is an engine.

16. An apparatus for controlling an articulated mobile machine during start-up, the articulated mobile machine having a prime power source, a means for transport, an articulating actuator system, and at least one auxiliary system; the means for transport, the articulating actuator system, and the at least one auxiliary system being controllably driven by the prime power source, comprising:

a steering control mechanism located on the articulated mobile machine;

a steering control angle sensor for sensing a steering control angle of the steering control mechanism;

an articulation angle sensor for sensing an articulation angle of the articulated mobile machine as a function of the articulating actuator system; and a controller adapted to compare the steering control angle with the articulation angle, start the prime power source, enable engagement of the at least one auxiliary system, disable engagement of the articulating actuator system in response to the steering control angle being greater than a predetermined difference in value from the articulation angle, and enable engagement of the articulating actuator system in response to the steering control angle being less than a predetermined difference in value from the articulation angle.

17. An apparatus, as set forth in claim 16, wherein the controller is further adapted to:

disable engagement of the means for transport in response to the steering control angle being greater than a predetermined difference in value from the articulation angle; and enable engagement of the means for transport in response to the steering control angle being less than a predetermined difference in value from the articulation angle.

18. An apparatus, as set forth in claim 17, further including a display located on the articulated mobile machine and adapted to display the difference between the steering control angle and the articulation angle.

19. An apparatus, as set forth in claim 17, wherein the means for transport is a drive train.

20. An apparatus, as set forth in claim 17, wherein the controller is located on the articulated mobile machine, and the controller is computer-based.

21. An apparatus, as set forth in claim 16, wherein the prime power source is an engine.

22. An apparatus, as set forth in claim 16, wherein the steering control mechanism is a steering wheel.

23. An apparatus for controlling a mobile machine during start-up, the mobile machine having a prime power source, a means for transport, and at least one auxiliary system; the means for transport and the at least one auxiliary system being controllably driven by the prime power source, comprising:

means for determining an actual angle of steering of the mobile machine;

means for comparing the actual angle of steering with a desired angle of steering;

means for starting the prime power source;

means for enabling engagement of the at least one auxiliary system;

means for disabling engagement of the means for transport in response to the difference between the actual angle of steering and the desired angle of steering being greater than a predetermined threshold value; and means for enabling engagement of the means for transport in response to the difference between the actual angle of steering and the desired angle of steering being less than a predetermined threshold value.

* * * * *